US012758951B2

(12) United States Patent
Wang et al.

(10) Patent No.: US 12,758,951 B2

(45) Date of Patent: Oct. 13, 2026

(54) CATALYST AND METHOD FOR SULFUR-TOLERANT SHIFT CATALYTIC REACTION

(71) Applicants: CHINA PETROLEUM & CHEMICAL CORPORATION, Beijing (CN); SINOPEC QILU COMPANY, Zibo (CN)

(72) Inventors: Min Wang, Zibo (CN); Jinshan Xu, Zibo (CN); Hantao Yu, Zibo (CN); Zhimin Bai, Zibo (CN); Hao Wang, Zibo (CN); Jianbo Jiang, Zibo (CN); Hongxia Xue, Zibo (CN)

(73) Assignees: CHINA PETROLEUM & CHEMICAL CORPORATION, Beijing (CN); SINOPEC QILU COMPANY, Zibo (CN)

( * ) Notice: Subject to any disclaimer, the term of this patent is extended or adjusted under 35 U.S.C. 154(b) by 825 days.

(21) Appl. No.: 18/250,725

(22) PCT Filed: Sep. 15, 2021

(86) PCT No.: PCT/CN2021/118430

§ 371 (c)(1),
(2) Date: Sep. 13, 2023

(87) PCT Pub. No.: WO2022/089072

PCT Pub. Date: May 5, 2022

(65) Prior Publication Data

US 2024/0238767 A1 Jul. 18, 2024

(30) Foreign Application Priority Data

Oct. 27, 2020 (CN) ........................ 202011166843.0

(51) Int. Cl.
*B01J 23/887* (2006.01)
*B01J 21/04* (2006.01)
(Continued)

(52) U.S. Cl.
CPC .......... *B01J 23/8871* (2013.01); *B01J 21/04* (2013.01); *B01J 23/8872* (2013.01);
(Continued)

(58) Field of Classification Search
CPC .... B01J 23/8871; B01J 21/04; B01J 23/8872; B01J 35/613; B01J 37/0236; B01J 37/035;
(Continued)

(56) References Cited

U.S. PATENT DOCUMENTS 3,975,303 A * 8/1976 Eyles ...................... B01J 37/20 502/303

FOREIGN PATENT DOCUMENTS

AU 4012999 A 2/2000
CA 911135 A 10/1972
(Continued)

OTHER PUBLICATIONS

Cesano et al. "Model oxide supported MoS2 HDS catalysts: structure and surface properties" Catal. Sci. Technol., 2011, 1, 123-136 (Year: 2011).*

*Primary Examiner* — Wayne A Langel
*Assistant Examiner* — Syed T Iqbal
(74) *Attorney, Agent, or Firm* — NKL Law; Allen Xue

(57) ABSTRACT

A sulfur-tolerant catalyst can be used in the sulfur-tolerant shift catalytic reaction. The catalyst has a carrier and a molybdenum oxide, a cobalt oxide and a cobalt-molybdenum-based perovskite composite oxide carried thereon. The cobalt-molybdenum-based perovskite composite oxide contains a molybdenum element, a cobalt element, an A ele-
(Continued)

ment, and an oxygen element. The A element is one or more selected from a group consisting of a rare-earth metal element, an alkali metal element and an alkaline earth metal element.

20 Claims, 3 Drawing Sheets

(51) Int. Cl.

| | |
|---|---|
| ***B01J 35/61*** | (2024.01) |
| ***B01J 37/02*** | (2006.01) |
| ***B01J 37/03*** | (2006.01) |
| ***B01J 37/08*** | (2006.01) |
| ***C01B 3/16*** | (2006.01) |

(52) U.S. Cl.
CPC ......... *B01J 35/613* (2024.01); *B01J 37/0236* (2013.01); *B01J 37/035* (2013.01); *B01J 37/036* (2013.01); *B01J 37/08* (2013.01); *C01B 3/16* (2013.01); *C01B 2203/0283* (2013.01); *C01B 2203/1052* (2013.01); *C01B 2203/1082* (2013.01)

(58) Field of Classification Search
CPC ........ B01J 37/036; B01J 37/08; B01J 23/002; B01J 23/28; B01J 35/60; B01J 23/882; B01J 23/887; B01J 35/30; B01J 35/615; B01J 37/03; B01J 37/031; B01J 37/088; B01J 2523/00; C01B 3/16; C01B 2203/0283; C01B 2203/1052; C01B 2203/1082; Y02P 20/52; C10K 3/04; C07C 1/04; C07C 9/04; C07C 1/0435; C07C 2523/882; C07C 2523/887
See application file for complete search history.

(56) References Cited

FOREIGN PATENT DOCUMENTS

| | | | | | |
|---|---|---|---|---|---|
| CN | 1241452 | A | | 1/2000 | |
| CN | 108722431 | A | | 11/2018 | |
| CN | 110876940 | A | * | 3/2020 | ............ B01J 23/005 |
| KR | 20110075323 | A | | 7/2011 | |

* cited by examiner

CATALYST AND METHOD FOR SULFUR-TOLERANT SHIFT CATALYTIC REACTION

CROSS-REFERENCE TO RELATED APPLICATIONS

This application is a national stage entry of International Application No. PCT/CN2021/118430, filed on Sep. 15, 2021, which claims the benefit of priority to Chinese Application No. 202011166843.0, filed on Oct. 27, 2020, entitled "a catalyst, a method for sulfur-tolerant shift catalytic reactions using the catalyst, and a method for preparing methane", the content of which is specifically and entirely incorporated herein by reference.

TECHNICAL FIELD

The invention relates to the field of sulfur-tolerant catalysts, and particularly to a catalyst and a method for sulfur-tolerant shift catalytic reactions using the catalyst.

BACKGROUND ART

The sulfur-tolerant shift is an important route for efficient coal utilization, it is currently the main approach to produce hydrogen gas, the catalyst is at the core of the sulfur-tolerant shift process.

Cobalt-molybdenum-based catalysts exhibit the advantages of sulfur tolerance, wide reaction temperature range, low costs, simple preparation process as compared with other types of catalysts, thus are most widely applied in the domestic and foreign plants.

The cobalt molybdenum-based sulfur-tolerant shift catalyst is required to have high activity and stability. During the sulfur-tolerant shift reaction using the cobalt-molybdenum-based sulfur-tolerant shift catalyst, $MoS_2$ is considered as the main active ingredient during the sulfur-tolerant shift reaction, however, when the $H_2S$ content in the feed gas is low, the catalytic activity of the cobalt molybdenum-based sulfur-tolerant shift catalyst is significantly reduced. Perovskite has desirable properties such as excellent electrical conductivity, magnetic properties, thermoelectricity, piezoelectricity, low manufacturing costs, and exhibits thermodynamic and mechanical stability at high temperature, meanwhile the perovskite is also an excellent oxygen ion and electron conductors under the high temperature conditions. However, the currently prepared perovskite-type sulfur-tolerant shift catalysts have a low specific surface area, which severely restrain an improvement of the catalytic activity of such catalysts.

SUMMARY OF THE INVENTION

The invention aims to overcome the defects in the prior art with respect to a low catalytic activity of sulfur-tolerant catalytic reaction, especially a low catalytic activity of sulfur-tolerant catalytic reaction for a feed gas having a low $H_2S$ content, and provides a catalyst and a method for sulfur-tolerant shift catalytic reaction using the same, wherein the catalyst has high catalytic activity and stability.

In order to fulfill the above purpose, a first aspect of the invention provides a catalyst comprising a carrier, and a molybdenum oxide, a cobalt oxide and a cobalt-molybdenum-based perovskite composite oxide carried thereon, the cobalt-molybdenum-based perovskite composite oxide comprises a molybdenum element, a cobalt element, an A element, and an oxygen element; wherein the A element is one or more selected from a group consisting of a rare-earth metal element, an alkali metal element and an alkaline earth metal element.

Preferably, the A element is one or more selected from a group consisting of La, Ce, Nd, Gd, Na, K, Mg, Ca and Sr.

Preferably, the A element includes an $A_1$ element being one or more of rare-earth metal elements and an $A_2$ element being one or more of alkali metal elements and alkaline earth metal elements; preferably, the $A_1$ element is one or more selected from a group consisting of La, Ce, Nd and Gd, the $A_2$ element is one or more selected from a group consisting of Na, K, Mg, Ca and Sr; preferably, a molar ratio of the $A_1$ element to the $A_2$ element is 1-99: 99-1, more preferably 1-9: 9-1.

Preferably, the catalyst exhibits a characteristic peak at 27.9±0.2°, preferably exhibits characteristic peaks at 24.9±0.2°, 27.9±0.2° and 36.2±0.2° in the X-Ray Diffraction (XRD) pattern.

Preferably, the catalyst has a main reduction peak temperature of 600° C. or more, preferably within a range of 600-850° C. in the $H_2$-TPR pattern.

Preferably, the catalyst has two or more, preferably three or more adsorption-desorption peaks at a temperature of 200° C. or more in a programmed temperature rise sulfidation test.

Preferably, the content of A element in the catalyst is 0.4 mol or more and less than 1 mol, preferably 0.4-0.9 mol, more preferably 0.5-0.9 mol, relative to the total content 1 mol of molybdenum element and cobalt element.

Preferably, the content of molybdenum in the catalyst is more than 0.4 mol and less than 1 mol, preferably more than 0.4 mol and less than 0.8 mol, more preferably 0.5-0.6 mol, further preferably 0.55-0.6 mol, relative to the total content 1 mol of molybdenum element and cobalt element.

Preferably, the carrier is alumina, silica, titanium dioxide, zirconium dioxide, magnesium oxide, nickel oxide and a carbon-based carrier or a composite carrier formed from two or more thereof, more preferably alumina or a composite carrier formed with the alumina and one or more selected from a group consisting of silica, titanium dioxide, zirconium dioxide, magnesium oxide, nickel oxide and a carbon-based carrier.

Preferably, the catalyst comprises a carrier in an amount of 30-90% by mass, more preferably 30-80% by mass.

Preferably, the catalyst has a specific surface area of 40 $m^2 \cdot g^{-1}$ or more, further preferably 50 $m^2 \cdot g^{-1}$ or more, more preferably 60 $m^2 \cdot g^{-1}$ or more.

In a second aspect, the invention provides a method for sulfur-tolerant shift catalytic reaction, comprising: contacting CO in a feed gas with water vapor in the presence of a catalyst of the invention; wherein the feed gas comprises $H_2S$ in an amount of 100 ppm or more, preferably within a range of 100-1,500 ppm.

The inventors have carried out in-depth researches and discovered that a catalyst having a perovskite structure and suitable composition can provide better catalytic performance than the conventional catalysts, and still exhibit high catalytic performance and strong stability under severe conditions such as low sulfur and low water-gas ratio.

On this basis, the excess Mo, Co forms a strong interaction with the perovskite bulk and the carrier, and there is a synergistic effect between the phases, thereby significantly improve stability of the sulfide intermediate.

Therefore, the invention allows a part of the cobalt and molybdenum to form a perovskite composite oxide with the A element by adding an excessive amount of cobalt and molybdenum during the process of carrying the cobalt-molybdenum-based perovskite composite oxide on a surface of the carrier, a part of the remaining cobalt and molybdenum is adhering to the surface of the perovskite composite oxide, another part of the cobalt and molybdenum carries out strong interaction with the carrier, thereby forming a strong synergistic effect between the perovskite structure and the carrier and the cobalt and molybdenum, such that the sulfides exist stably after sulfurization of the catalyst, and the catalyst can exhibit a high stability without deactivation during the reaction process when the content of $H_2S$ in the reaction gas is low.

According to a preferred embodiment of the invention, $Al_2O_3$ is a conventional carrier having a high specific surface area, it has an abundant organic groups present on the surface; when the active ingredient of the catalyst is dispersed on the surface thereof, its surface undergoes strong interaction with the active ingredient; if a cobalt-molybdenum perovskite composite oxide is supported on a surface of the carrier by means of a suitable preparation mode, it not only can produce the advantage of the perovskite type catalyst, but also can exploit the characteristic of strong interaction of $Al_2O_3$ with the active ingredient, significantly enhance the synergistic effect of the carrier with the perovskite composite oxide, such that the sulfide stability of the sulfur-tolerant catalyst during the reaction is significantly improved.

The catalyst of the invention has the following advantages:

(1) The catalyst of the invention not only has a high specific surface area and high sulfur-tolerant catalytic activity of the perovskite-type catalyst, but also allows the strong interaction of cobalt and molybdenum of the catalyst with the perovskite composite oxide and the carrier, and there is a synergistic effect between the carrier-perovskite structure-cobalt and molybdenum, such that the catalyst can have high stability and catalyst life under the harsh conditions of low sulfur content, while maintaining a high catalytic activity. Furthermore, the catalyst has a high specific surface area, and an increased exposure amount of active sites, thus the catalytic activity is significantly increased.

(2) The catalyst of the invention can be used as a sulfur-fixing sulfur-tolerant shift catalyst, and has high stability and catalyst life under severe conditions of low sulfur content.

(3) The preparation process of the catalyst in the invention has the advantages of relatively simple, low cost and easy operation, thus the catalyst is suitable for the large-scale industrial applications.

DESCRIPTION OF THE PREFERRED EMBODIMENT

Figure 1:
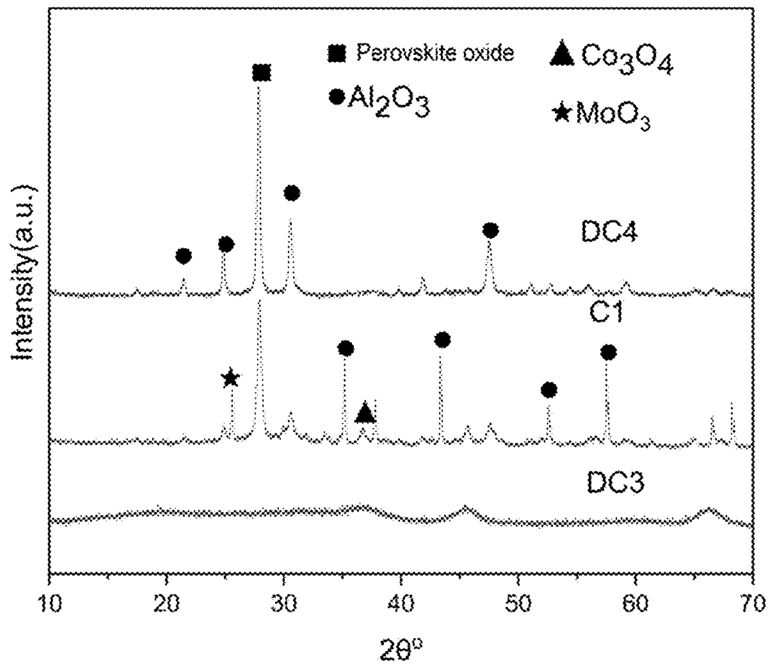
FIG. 1 illustrates XRD patterns of the catalysts prepared in Example 1 and Comparative Examples 3-4 of the invention.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the invention provides a catalyst comprising a carrier, and a molybdenum oxide, a cobalt oxide and a cobalt-molybdenum-based perovskite composite oxide carried thereon, the cobalt-molybdenum-based perovskite composite oxide comprises a molybdenum element, a cobalt element, an A element, and an oxygen element; wherein the A element is one or more selected from a group consisting of a rare-earth metal element, an alkali metal element and an alkaline earth metal element.

In the invention, the molybdenum oxide may be any oxide of molybdenum, preferably a molybdenum oxide obtained from calcination of a molybdenum salt, such as $MoO_3$, $MoO_2$, or MoO; the cobalt oxide may be any oxide of cobalt, preferably a cobalt oxide obtained from calcination of a cobalt salt, such as $Co_3O_4$, CoO. According to a preferred embodiment of the invention, the molybdenum oxide is $MoO_3$ and the cobalt oxide is $Co_3O_4$.

In the catalyst of the invention, the A element is a structural adjuvant, it may be the A element ingredient of any of the existing perovskite composite oxide (represented by the general formula $ABO_3$ as a cobalt-molybdenum-based perovskite composite oxide, wherein the element B is Co and Mo), for example, the A element is one or more selected from a group consisting of a rare-earth metal element, an alkali metal element and an alkaline earth metal element. As a rare-earth metal element, for example, the A element may be La, Ce, Nd, Gd; as an alkali metal element, for example, the A element may be Na, K; as an alkaline earth metal element, for example, the A element may be Mg, Ca, Sr. Among them, the A element is preferably a rare-earth metal element and/or an alkaline earth metal element, and more preferably, La, Ce, Mg, Ca, Sr and the like.

According to one preferred embodiment of the invention, the A element includes an $A_1$ element being one or more of rare-earth metal elements and an $A_2$ element being one or more of alkali metal elements and alkaline earth metal elements; preferably, an alkaline earth metal element.

For example, a cobalt-molybdenum-based perovskite composite oxide may be represented by the general formula $(A_1)_x(A_2)_{1-x}BO_3$, wherein the B element is Co and Mo, x may be 0.1 or more, 0.15 or more, 0.2 or more, 0.25 or more, 0.3 or more, 0.35 or more, 0.4 or more, or 0.45 or more, and x may be 0.95 or less, 0.9 or less, 0.85 or less, 0.8 or less, 0.75 or less, 0.7 or less, 0.65 or less, 0.6 or less, or 0.55 or less.

Preferably, the $A_1$ element is one or more selected from a group consisting of La, Ce, Nd and Gd, the $A_2$ element is one or more selected from a group consisting of Na, K, Mg, Ca and Sr. The catalytic activity and stability of the catalyst can be further enhanced by the coordination of the $A_1$ element and the $A_2$ element.

Preferably, a molar ratio of the $A_1$ element to the $A_2$ element is preferably 1-99: 99-1, more preferably 1-9: 9-1, further preferably 1-2:2-1. By containing the $A_1$ element and the $A_2$ element at the above ratio, the catalytic activity and stability of the catalyst can be further improved.

The cobalt-molybdenum-based perovskite composite oxide is not particularly limited in the invention, as long as it possesses a perovskite structure. Preferably, the content of molybdenum in the catalyst is more than 0.4 mol and less than 1 mol, preferably more than 0.4 mol and less than 0.8 mol, more preferably 0.5-0.6 mol, further preferably 0.55-0.6 mol, relative to the total content 1 mol of molybdenum element and cobalt element. The cobalt-molybdenum-based perovskite composite oxide may be represented, for example, by $AMo_zCo_{1-z}O_3$, wherein z is more than 0.4 and less than 1, preferably more than 0.4 and less than 0.8, more preferably 0.5-0.6, further preferably 0.55-0.6. In view of further improving the catalytic activity and stability of the catalyst, the molar ratio of molybdenum element and cobalt element in the catalyst may be preferably 0.5-0.6:0.4-0.5, more preferably 0.52-0.56:0.44-0.48.

In order to ensure that the catalyst comprises a molybdenum oxide, a cobalt oxide and a cobalt-molybdenum-based perovskite composite oxide in appropriate amounts, thereby improving its catalytic activity and stability, it is preferred that the content of the A element in the catalyst is 0.4 mol or more and less than 1 mol, preferably 0.4-0.9 mol, more preferably 0.5-0.9 mol, relative to the total content 1 mol of molybdenum element and cobalt element.

In the invention, molybdenum element and cobalt element theoretically form a perovskite composite oxide with the A element in a total amount of 1:1 (molar ratio), and the remaining molybdenum and cobalt elements are present in a form of the respective oxide or the composite oxides thereof. In view of the detection means at present and the practical use effects of the invention, without theoretically constraints, the invention ensures that the catalyst comprises an oxide of molybdenum (molybdenum oxide), an oxide of cobalt (cobalt oxide) and a perovskite composite oxide, as long as the molybdenum and cobalt elements contained in the catalyst in an amount larger than the stoichiometric amounts required for the formation of the perovskite composite oxide with the A element, the invention does not require that the perovskite composite oxide is formed in the theoretical amounts. The exact amounts of the molybdenum oxide, the cobalt oxide and the perovskite composite oxide do not affect the execution of the invention, each of the amounts falls into the scope of the invention.

According to the invention, the carrier is alumina, silica, titanium dioxide, zirconium dioxide, magnesium oxide, nickel oxide and a carbon-based carrier or a composite carrier formed from two or more thereof. Preferably, the carrier is alumina, silica, titanium dioxide and zirconium dioxide or a composite carrier formed from two or more thereof. When considering from a perspective of an interaction of the molybdenum oxide, the cobalt oxide, the cobalt-molybdenum-based perovskite composite oxide with the carrier, the carrier preferably comprises an alumina carrier, more preferably, the carrier is alumina, silica, titanium dioxide, zirconium dioxide, magnesium oxide, nickel oxide and carbon-based carrier, or a composite carrier formed from two or more thereof.

Further, the invention does not impose specific limitation on existence form of the alumina carrier in the catalyst, the alumina may be one or more of $\alpha$-$Al_2O_3$, $\beta$-$Al_2O_3$, $\gamma$-$Al_2O_3$, or amorphous alumina, provided that the catalyst provides the desired catalytic activity. Preferably, the alumina carrier includes at least a portion of $\gamma$-$Al_2O_3$ in view of increasing the specific surface area of the catalyst thereby enhancing the catalytic activity. The alumina carrier of the catalyst in the invention may be formed by a process of in situ preparation, and the catalyst of the invention can also be obtained by loading with the alumina carrier.

In order to further improve the catalytic activity and stability, the catalyst comprises a carrier in an amount of 30-90% by mass, preferably 30-80% by mass, more preferably 50-80% by mass. According to the invention, the catalyst has a specific surface area of 40 $m^2 \cdot g^{-1}$ or more, preferably 50 $m^2 \cdot g^{-1}$ or more or 60 $m^2 \cdot g^{-1}$ or more, more preferably 70 $m^2 \cdot g^{-1}$ or more or 80 $m^2 \cdot g^{-1}$ or more, and still more preferably 90 $m^2 \cdot g^{-1}$ or more or 100 $m^2 \cdot g^{-1}$ or more, for example 40-180 $m^2 \cdot g^{-1}$.

The specific surface area of the catalyst can be increased by containing a carrier, thus the catalyst preferably comprises a carrier.

In the invention, the perovskite composite oxide, the molybdenum oxide, the cobalt oxide, the cobalt-molybdenum-based perovskite composite oxide and the carrier contained in the catalyst, may be characterized by the method such as X-Ray Diffraction (XRD). According to the catalyst of one preferred embodiment of the invention, in the XRD pattern, the characteristic peak at 25.5±0.2° shows $MoO_3$, the characteristic peak at 36.2±0.2° shows $CoO_4$, and the characteristic peak at 27.9±0.2° shows cobalt-molybdenum-based perovskite composite oxide. In regard to the carrier, taking the use of an alumina carrier as an example, the characteristic peaks may be present at one or more of 24.9±0.2°, 30.6±0.2°, 35.2±0.2°, 43.3±0.2°, 52.5±0.2°, 57.5±0.2°, depending on the different existence form of the alumina carrier.

According to the invention, the TPR pattern of the catalyst shows that the catalyst has a main reduction peak temperature of 600° C. or more, preferably within a range of 600-850° C., more preferably within a range of 700-800° C. It demonstrates that a majority of the reduction temperatures of the reducible species inside the catalyst is above 600° C., as can be seen, the molybdenum oxide and cobalt oxide have strong interaction force with the carrier and the perovskite composite oxide in the catalyst. In the invention, the term "main reduction peak temperature" refers to the peak temperature corresponding to the reduction peak having the largest peak area in the TPR pattern of the catalyst.

According to the invention, the temperature-programmed sulfidation (TPS) pattern of the catalyst shows that the catalyst has two or more, preferably three or more adsorption-desorption peaks at a temperature of 200° C. or more; more preferably, the catalyst has two or more (e.g., 3-5) adsorption-desorption peaks at a temperature range of 200° C.-600° C. (preferably 200° C.-500° C.), in the programmed temperature rise sulfidation test of the catalyst. The catalyst of the invention exhibits, after sulfidation, a decomposition temperature of sulfide in the catalyst higher than of 200° C. along with the temperature rise, and a plurality of adsorption-desorption peaks at a temperature range of 200° C.-600° C., indicating a strong stability of the sulfide active ingredient formed after sulfidation of the catalyst. According to a preferred embodiment of the invention, in the programmed temperature rise sulfidation test of the catalyst, there are adsorption-desorption peaks at a temperature range of 250° C.-270° C., 330° C.-350° C., 410° C.-430° C., respectively.

A method of preparing the catalyst of the invention mentioned above may, for example, comprise forming a gel from a precursor solution comprising a carrier or a carrier precursor, a molybdenum-containing compound, a cobalt-containing compound, a compound containing the A element and a complexing agent, and then subjecting the gel to drying and calcining sequentially, wherein the A element is one or more selected from a group consisting of a rare-earth metal element, an alkali metal element and an alkaline earth metal element. In the preparation process, the carrier or the carrier precursor may be directly used as the carrier or used to form the carrier; the molybdenum-containing compound, the cobalt-containing compound and the compound containing an A element are jointly used to form an active ingredient of molybdenum oxide, cobalt oxide and cobalt-molybdenum-based perovskite composite oxide supported on the carrier. Preferably, preparation of the carrier and formation of the active material are simultaneously performed by using a one-step process (i.e., the carrier is synthesized using an in situ preparation process), thereby obtaining a structure in which the molybdenum oxide, the cobalt oxide and the cobalt-molybdenum-based perovskite composite oxide are simultaneously carried on the carrier.

In the preparation method of the invention, each of the molybdenum-containing compound, the cobalt-containing compound, and the elemental A-containing compound is preferably a soluble salt of the corresponding element (e.g., nitrate, chloride, sulfate, acetate). For example, the molybdenum-containing compound may be one or more of ammonium molybdate, molybdenum nitrate, and molybdenum acetate; the cobalt-containing compound may be one or more selected from a group consisting of cobalt nitrate, cobalt chloride, cobalt acetate and cobalt carbonate; the elemental A-containing compound may be one or more selected from a group consisting of lanthanum nitrate, cerium nitrate, neodymium nitrate, gadolinium nitrate, sodium nitrate, potassium nitrate, magnesium nitrate, calcium nitrate and strontium nitrate. Taking an alumina carrier as an example, the carrier or carrier precursor may be an alumina carrier, and the specific aluminum-containing compound may be one or more selected from a group consisting of aluminum isopropoxide, aluminum nitrate, aluminum acetate, pseudo-boehmite or alumina.

The precursor solution may be prepared by dissolving the constituent compounds in water, with respect to the method of mixing the specific compounds, it may be either directly dissolving the compounds in water, or the mixing may be directly carried out by using an aqueous solution of the compounds. As a preferred mixing sequence, the carrier or carrier precursor, the molybdenum-containing compound, the cobalt-containing compound, the A element-containing compound, or the aqueous solution thereof may be blended sequentially, wherein the molybdenum-containing compound and the cobalt-containing compound may be dissolved simultaneously to form an aqueous solution containing molybdenum and cobalt and then carrying out further mixing.

As a specific example of the preparation process of the precursor solution described above, the preparation process may comprise the following steps:

(1) Taking a carrier or a carrier precursor and adding it into deionized water and mixing uniformly;
(2) Adding an aqueous solution of the compound containing the A element into the mixture obtained in step (1) and blending uniformly.
(3) Taking an aqueous solution containing molybdenum compound and an aqueous solution containing cobalt compound and separately adding dropwise into the mixture obtained in step (2), and blending uniformly to obtain a new liquid mixture.

According to the invention, in order to promote formation of the perovskite composite oxide, the precursor solution further comprises a complexing agent. An example of the complexing agent may be one or more selected from a group consisting of citric acid, ethylene diamine tetraacetic acid (EDTA), aminoacetic acid, acrylamide, lactic acid, tartaric acid and hydroxybutyric acid.

The addition of the complexing agent to the precursor solution can improve dispersibility of the active ingredient on the carrier surface, the complexing agent comprises an organic group which is capable of chelating with the metal, and effectively promoting the interaction between the metals during the reaction process, thereby facilitating the formation of a perovskite phase and enhancing dispersibility of the active ingredient. Preferably, the complexing agent is used in an amount of 1-4 mol, preferably 1-3 mol, more preferably 1-2 mol, relative to a total amount 1 mol of metal ions contained in the precursor solution. In addition, the complexing agent is preferably added sequentially or simultaneously with the carrier or the carrier precursor during the preparation process of the precursor solution, for example, citric acid is added in step (1) in the specific example of preparing the precursor solution described above.

For the sake of improving the catalytic activity and stability of the produced catalyst, it is preferred that the amount of the molybdenum-containing compound calculated in term of molybdenum is preferably more than 0.4 mol and less than 1 mol, more preferably more than 0.4 mol and less than 0.8 mol, further preferably 0.5-0.6 mol, still further preferably 0.55-0.6 mol, relative to a combined amount 1 mol of the molybdenum-containing compound calculated in term of molybdenum and the cobalt-containing compound calculated in term of cobalt in the precursor solution. Preferably, a molar ratio of the molybdenum-containing compound calculated in term of molybdenum and the cobalt-containing compound calculated in term of cobalt is 0.5-0.6:0.4-0.5, more preferably 0.52-0.56:0.44-0.48.

In order to ensure that the prepared catalyst comprises the molybdenum oxide, the cobalt oxide and the cobalt-molybdenum-based perovskite composite oxide in appropriate amounts respectively, it is preferred that the amount of the compound containing the A element calculated in term of A element is 0.4 mol or more and less than 1 mol, more preferably 0.4-0.9 mol, further preferably 0.5-0.9 mol relative to the combined amount 1 mol of the molybdenum-containing compound calculated in term of molybdenum and the cobalt-containing compound calculated in term of cobalt.

The invention does not impose specific limitation on the mode of forming a gel with the precursor solution, for example, the gel may be produced by removing at least a part of water from the precursor solution. The specific conditions of forming the gel may comprise: a temperature of 40-90° C., preferably 60-80° C., more preferably 70-80° C., and a time of 4-24 hours, preferably 5-10 hours, more preferably 6-8 hours.

In the invention, the modes of performing the drying and calcining process are not specifically limited, it may be implemented by using any apparatus and condition for preparing the catalyst.

For the purpose of improving the catalytic activity and stability of the catalyst, the drying conditions may comprise: a temperature within a range of 60-200° C., preferably 80-150° C., more preferably 80-120° C., still more preferably 80-110° C., and a time of 4-15 h, preferably 5-15 h, more preferably 6-12 h. The calcining conditions may comprise: a temperature within a range of 400-1,300° C., preferably 500-900° C., more preferably 600-900° C., and a time of 4-48 h, preferably 6-12 h, more preferably 8-12 h.

The catalytic activity and stability of the prepared catalyst may be further enhanced by carrying out the drying and calcining with the above conditions. In addition, in view of improving the specific surface area of the catalyst thereby enhancing the catalytic activity and stability of the catalyst, the calcining temperature is preferably within a range of 600-700° C.

According to a second aspect, the invention provides a method for sulfur-tolerant shift catalytic reaction, comprising: contacting CO in a feed gas with water vapor in the presence of a catalyst of the invention; wherein the feed gas comprises $H_2S$ in an amount of 100 ppm or more, preferably within a range of 100-1,500 ppm.

As described above, the catalyst of the invention is preferably used as a sulfur-tolerant shift catalyst. By using the catalyst of the invention, the desirable catalytic effect can be produced with a feed gas having a $H_2S$ content of 100 ppm or more (e.g., 100-2,000 ppm or 300-2,000 ppm).

In particular, the desired CO conversion can be obtained even when the $H_2S$ content of the feed gas is low (e.g., 1,500 ppm or less, 1,000 ppm or less, 800 ppm or less, 600 ppm or less, or 500 ppm or less).

The invention will be described below in detail with reference to examples.

Example 1

1.74 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C1. It was determined by XRF measurement that the final alumina carrier was 70% of the total mass of the catalyst, a molar ratio of La element to the sum of Mo element and Co element was 1:2, and a molar ratio of Mo element to Co element was 0.55:0.45.

Example 2

0.64 mol of pseudo-boehmite and 2 mol of citric acid were taken and poured into deionized water and mixed uniformly; an aqueous solution of 0.13 mol of cerium nitrate was taken and dropwise added into the above solution, the mixture was blended uniformly. An aqueous solution of 0.13 mol of ammonium molybdate and an aqueous solution of 0.13 mol of cobalt nitrate were taken and dropwise added to the above solution respectively, and blended uniformly to form a precursor solution. The precursor solution was then heated to 60° C. for evaporating the water for 10 hours to gradually change the precursor solution into a gel. The obtained gel was subjected to drying at 120° C. for 8 hours. The dried solid was subjected to calcining at 800° C. for 12 hours to prepare a catalyst C2. It was determined by XRF measurement that the final alumina carrier was 40% of the total mass of the catalyst, a molar ratio of La element to the sum of Mo element and Co element was 1:2, and a molar ratio of Mo element to Co element was 1:1.

Example 3

0.48 mol of aluminum nitrate and 2 mol of citric acid were taken and poured into deionized water and mixed uniformly; an aqueous solution of 0.21 mol of magnesium nitrate was taken and dropwise added into the above solution, the mixture was blended uniformly. An aqueous solution of 0.25 mol of ammonium molybdate and an aqueous solution of 0.17 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C3. It was determined by XRF measurement that the final alumina carrier was 30% of the total mass of the catalyst, a molar ratio of element Mg to the sum of Mo element and Co element was 1:2, and a molar ratio of Mo element to Co element was 0.6:0.4.

Example 4

0.91 mol of aluminum nitrate and 2 mol of citric acid were taken and poured into deionized water and mixed uniformly; an aqueous solution of 0.11 mol of calcium nitrate was taken and dropwise added into the above solution, the mixture was blended uniformly. An aqueous solution of 0.12 mol of ammonium molybdate and an aqueous solution of 0.1 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C4. It was determined by XRF measurement that the final alumina carrier was 60% of the total mass of the catalyst, a molar ratio of Ca element to the sum of Mo element and Co element was 1:2, and a molar ratio of Mo element to Co element was 0.55:0.45.

Example 5

1.54 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.1 mol of ammonium molybdate and an aqueous solution of 0.1 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C5. It was determined by XRF measurement that the final alumina carrier was 70% of the total mass of the catalyst, a molar ratio of La element to the sum of Mo element and Co element was 1:2, and a molar ratio of Mo element to Co element was 1:1.

Example 6

1.76 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.12 mol of ammonium molybdate and an aqueous solution of 0.08 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C6. It was determined by XRF measurement that the final alumina carrier was 70% of the total mass of the catalyst, a molar ratio of La element to the sum of Mo element and Co element was 1:2, and a molar ratio of Mo element to Co element was 0.6:0.4.

Example 7

1.81 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.14 mol of ammonium molybdate and an aqueous solution of 0.06 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C7. It was determined by XRF measurement that the final alumina carrier was 70% of the total mass of the catalyst, a molar ratio of La element to the sum of Mo element and Co element was 1:2, and a molar ratio of Mo element to Co element was 0.7:0.3.

Example 8

1.95 mol of aluminum isopropoxide and 2 mol of citric acid were taken and poured into deionized water and mixed uniformly; an aqueous solution of 0.13 mol of lanthanum nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C8. It was determined by XRF measurement that the final alumina carrier was 70% of the total mass of the catalyst, a molar ratio of La element to the sum of Mo element and Co element was 1:1.5, and a molar ratio of Mo element to Co element was 0.55:0.45.

Example 9

1.96 mol of aluminum isopropoxide and 2 mol of citric acid were taken and poured into deionized water and mixed uniformly; an aqueous solution of 0.15 mol of lanthanum nitrate was taken and dropwise added into the above solution, the mixture was blended uniformly. An aqueous solution of 0.097 mol of ammonium molybdate and an aqueous solution of 0.078 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C9. It was determined by XRF measurement that the final alumina carrier was 70% of the total mass of the catalyst, a molar ratio of La element to the sum of Mo element and Co element was 1:1.2, and a molar ratio of Mo element to Co element was 0.55:0.45.

Example 10

1.74 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 800° C. for 8 hours to prepare a catalyst C10. It was determined by XRF measurement that the final alumina carrier was 70% of the total mass of the catalyst, a molar ratio of La element to the sum of Mo element and Co element was 1:2, and a molar ratio of Mo element to Co element was 0.55:0.45.

Example 11

1.74 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 900° C. for 8 hours to prepare a catalyst C11. It was determined by XRF measurement that the final alumina carrier was 70% of the total mass of the catalyst, a molar ratio of La element to the sum of Mo element and Co element was 1:2, and a molar ratio of Mo element to Co element was 0.55:0.45.

Example 12

0.87 mol of $\alpha$-$Al_2O_3$ and 2 mol of citric acid were taken and poured into deionized water and mixed uniformly to form a suspension; an aqueous solution of 0.1 mol of lanthanum nitrate was taken and dropwise added into the above suspension, the mixture was blended uniformly. An aqueous solution of 0.11 mol of ammonium molybdate and an aqueous solution of 0.09 mol of cobalt nitrate were taken and dropwise added to the suspension respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C12. It was determined by XRF measurement that the final alumina carrier was 70% of the total mass of the catalyst, a molar ratio of La element to the sum of Mo element and Co element was 1:2, and a molar ratio of Mo element to Co element was 0.55:0.45.

Example 13

1.48 mol of aluminum isopropoxide and 2 mol of citric acid were taken and poured into deionized water and mixed uniformly; an aqueous solution of 0.05 mol of lanthanum nitrate and 0.05 mol of magnesium nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C13. It was determined by XRF measurement that the final alumina carrier was 70% of the total mass of the catalyst, a molar ratio of the sum of La element and Mg element to the sum of Mo element and Co element was 1:2, a molar ratio of La element to Mg element was 1:1, and a molar ratio of Mo element to Co element was 0.55:0.45.

Example 14

1.52 mol of aluminum isopropoxide and 2 mol of citric acid were taken and poured into deionized water and mixed uniformly; an aqueous solution of 0.05 mol of lanthanum nitrate and 0.05 mol of calcium nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C14. It was determined by XRF measurement that the final alumina carrier was 70% of the total mass of the catalyst, a molar ratio of the sum of La element and Ca element to the sum of Mo element and Co element was 1:2, a molar ratio of La element to Ca element was 1:1, and a molar ratio of Mo element to Co element was 0.55: 0.45.

Example 15

1.64 mol of pseudo-boehmite and 2 mol of citric acid were taken and poured into deionized water and mixed uniformly; an aqueous solution of 0.08 mol of lanthanum nitrate and 0.02 mol of calcium nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C15. It was determined by XRF measurement that the final alumina carrier was 70% of the total mass of the catalyst, a molar ratio of the sum of La element and Ca element to the sum of Mo element and Co element was 1:2, a molar ratio of La element to Ca element was 1:1, and a molar ratio of Mo element to Co element was 0.55:0.45.

Example 16

1.25 mol of pseudo-boehmite, 0.26 mol of metatitanic acid and 2 mol of citric acid were taken and poured into deionized water and mixed uniformly; an aqueous solution of 0.05 mol of lanthanum nitrate and 0.05 mol of calcium nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst C16. It was determined by XRF measurement that the final alumina carrier was 70% of the total mass of the catalyst, a molar ratio of the sum of La element and Ca element to the sum of Mo element and Co element was 1:2, a molar ratio of La element to Ca element was 1:1, and a molar ratio of Mo element to Co element was 0.55:0.45.

Comparative Example 1

1.48 mol of aluminum isopropoxide was taken and poured into deionized water and mixed uniformly; an aqueous solution of 0.05 mol of lanthanum nitrate and 0.05 mol of magnesium nitrate were taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC1. It was determined by XRF measurement that the final alumina carrier was 70% of the total mass of the catalyst, a molar ratio of the sum of La element and Mg element to the sum of Mo element and Co element was 1:2, a molar ratio of Mo element to Co element was 0.55:0.45.

Comparative Example 2

1.22 mol of aluminum isopropoxide and 2 mol of citric acid were taken and poured into deionized water and mixed uniformly; an aqueous solution of 0.1 mol of lanthanum nitrate was taken and dropwise added into the above solution, the mixture was blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC2. It was determined by XRF measurement that the final alumina carrier was 70% of the total mass of the catalyst, a molar ratio of the La element to the sum of Mo element and Co element was 1:1, a molar ratio of Mo element to Co element was 0.55:0.45.

Comparative Example 3

0.21 mol of ammonium molybdate and 0.17 mol of cobalt nitrate were dissolved in deionized water, the aqueous solution was then used for carrying out an equivalent-volume impregnation of 2 mol of pseudo-boehmite, the impregnated pseudo-boehmite was subjected to drying at 120° C. for 12 hours. The dried pseudo-boehmite was subjected to calcining at 600° C. for 8 hours to prepare a catalyst DC3. It was determined by XRF measurement that the final alumina carrier was 70% of the total mass of the catalyst, a molar ratio of Mo element to Co element was 0.55:0.45.

Comparative Example 4

124.3 g of $\alpha$-$Al_2O_3$ and 2 mol of citric acid were taken and poured into deionized water and mixed uniformly to form a suspension; an aqueous solution of 0.2 mol of lanthanum nitrate was subsequently taken and dropwise added into the above suspension, the mixture was blended uniformly. An aqueous solution of 0.11 mol of ammonium molybdate and an aqueous solution of 0.09 mol of cobalt nitrate were taken and dropwise added to the suspension respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC4. It was determined by XRF measurement that the final alumina carrier was 70% of the total mass of the catalyst, a molar ratio of La element to the sum of Mo element and Co element was 1:1, and a molar ratio of Mo element to Co element was 0.55:0.45.

Comparative Example 5

2 mol of citric acid was taken and poured into deionized water and mixed uniformly; an aqueous solution of 0.1 mol of lanthanum nitrate was subsequently taken and dropwise added into the above solution, the mixture was blended uniformly. An aqueous solution of 0.055 mol of ammonium molybdate and an aqueous solution of 0.045 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC5. It was determined by XRF measurement that a molar ratio of the La element to the sum of Mo element and Co element was 1:1, and a molar ratio of Mo element to Co element was 0.55:0.45.

Comparative Example 6

2 mol of citric acid was taken and poured into deionized water and mixed uniformly; an aqueous Solution of 0.1 mol of lanthanum nitrate was taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC6. It was determined by XRF measurement that a molar ratio of the La element to the sum of Mo element and Co element was 1:2, and a molar ratio of Mo element to Co element was 0.55:0.45.

Comparative Example 7

1.1 mol of aluminum isopropoxide and 2 mol of citric acid were taken and poured into deionized water and mixed uniformly; an aqueous solution of 0.11 mol of ammonium molybdate and an aqueous solution of 0.09 mol of cobalt nitrate were then taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC7. It was determined by XRF measurement that the final alumina carrier was 70% of the total mass of the catalyst, a molar ratio of Mo element to Co element was 0.55:0.45.

Comparative Example 8

53.8 g of $\alpha$-$Al_2O_3$ and 2 mol of citric acid were taken and poured into deionized water and mixed uniformly; an aqueous solution of 0.11 mol of ammonium molybdate and an aqueous solution of 0.09 mol of cobalt nitrate were taken and dropwise added to the suspension respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC8. It was determined by XRF measurement that the final alumina carrier was 70% of the total mass of the catalyst, and a molar ratio of Mo element to Co element was 0.55:0.45.

Comparative Example 9

1.638 mol of aluminum isopropoxide was taken and poured into deionized water and mixed uniformly; an aqueous solution of 0.1 mol of lanthanum nitrate was subsequently taken and dropwise added into the above solution, the mixture was blended uniformly. An aqueous solution of 0.11 mol of ammonium molybdate and an aqueous solution of 0.09 mol of cobalt nitrate were taken and dropwise added to the above solution respectively, and blended uniformly to form a precursor solution. The precursor solution was then heated to 80° C. for evaporating the water for 6 hours to gradually change the precursor solution into a gel. The obtained gel was subjected to drying at 120° C. for 12 hours. The dried solid was subjected to calcining at 600° C. for 8 hours to prepare a catalyst DC9. It was determined by XRF measurement that the final alumina carrier was 70% of the total mass of the catalyst, a molar ratio of the La element to the sum of Mo element and Co element was 1:2, a molar ratio of Mo element to Co element was 0.55:0.45.

Test Example 1

The X-Ray Diffraction (XRD) characterization of the catalysts prepared in Example 1, Comparative Example 4 and Comparative Example 3 was performed by using an X' Pert3 Powder type X-ray diffractometer, a Cu Kα target radiation (incident wavelength 1.54056 Å) was used, a scan range was 0-90°, a scan speed was 10°/min, the obtained pattern was shown in FIG. 1.

As illustrated in FIG. 1, the characteristic peaks were shown at 24.9°, 25.5°, 27.9°, 30.6°, 35.2°, 36.2°, 43.3°, 52.5°, 57.5°, respectively in the XRD pattern of the catalyst C1 prepared in Example 1; the characteristic peaks were shown at 21.6°, 24.9°, 27.9°, 30.6°, 43.3°, 47.5°, respectively in the XRD pattern of the catalyst DC4 prepared in Comparative Example 4; the characteristic peaks were not obviously shown in the XRD pattern of the catalyst DC3 prepared in Comparative Example 3. Among the characteristic peaks, the characteristic peak at 25.5° showed an existence of $MoO_3$, the characteristic peak at 36.2° illustrated an existence of C0304, the characteristic peak at 27.9° showed an existence of cobalt-molybdenum-based perovskite composite oxide, the characteristic peaks at 21.6°, 24.9°, 30.6°, 35.2°, 43.3°, 47.5°, 52.5°, 57.5° and the like illustrated an existence of $Al_2O_3$ carrier.

Similarly, the catalysts prepared in Examples 2-16 and Comparative Examples 2, 5-9 were subjected to XRD characterization by means of the aforementioned method. According to the measurement results, the XRD patterns of the catalysts prepared in Examples 2-16 of the invention were similar with the XRD pattern of the catalyst prepared in Example 1, each of the XRD pattern showed the characteristic peaks of C0304, $MoO_3$, cobalt molybdenum-based perovskite composite oxide and alumina carrier. However, the catalysts of Comparative Examples 1, 3 and 7-9 were not provided with a perovskite structure.

Test Example 2

Figure 2:
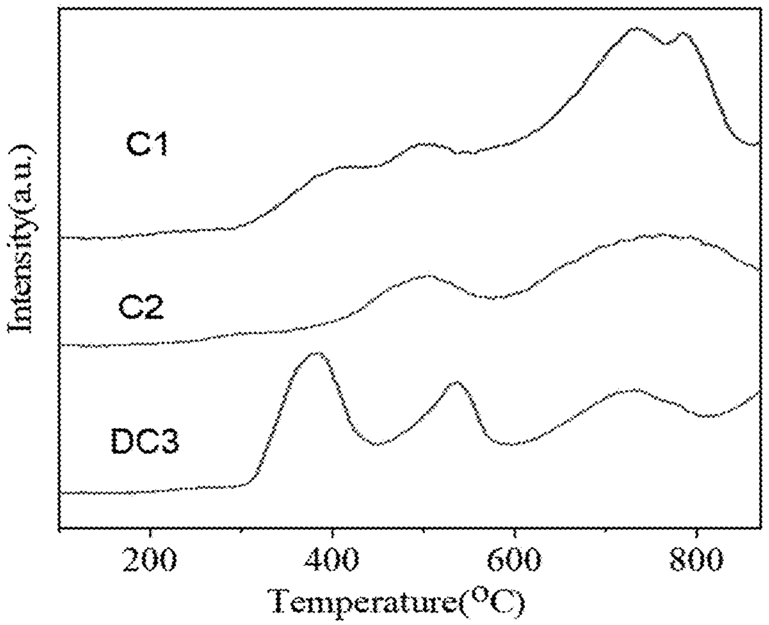
FIG. 2 illustrates $H_2$-TPR patterns of catalysts prepared in Examples 1-2 and Comparative Example 3 of the invention.

The $H_2$-TPR pattern of the catalysts prepared in Examples 1-2 and Comparative Example 3 were determined by using a TP5080 adsorption instrument manufactured by Tianjin Xianquan Industry and Trade Development Co., LTD, the results were shown in FIG. 2.

As illustrated in FIG. 2, both of the main reduction peak temperatures of the catalysts prepared in Examples 1-2 were within a range of 700-750° C., which was much higher than the main reduction peak temperature (below 400° C.) of the catalyst prepared in Comparative Example 3; it demonstrated the strong interaction of the active ingredients in the catalysts of the invention with the perovskite bulk and the alumina carrier.

Test Example 3

Figure 3:
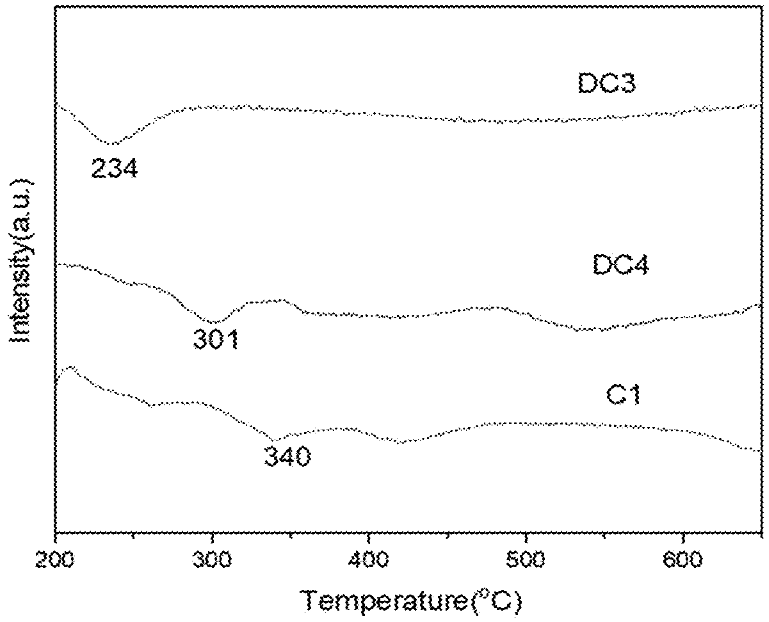
FIG. 3 illustrates TPS patterns of catalysts prepared in Example 1 and Comparative examples 3-4 of the invention.

With respect to the sulfiding behavior of the catalysts, the sulfiding capacity of the catalysts prepared in Example 1 and Comparative Examples 3-4 was measured by using a TPS-5096 temperature-programmed sulfidation instrument manufactured by Tianjin Xianquan Industry and Trade Development Co., LTD for carrying out the temperature-programmed sulfidation (TPS), the results were shown in FIG. 3. The specific measurement method was as follows: 0.3 g of 20 mesh catalyst particles was firstly weighted and loaded into a reaction tube via a funnel, the reaction tube was heated to 40° C. at a temperature rise rate of 10° C./min in $N_2$ atmosphere, the temperature was maintained for 30 min, and then cooled to room temperature. The gas was switched to a gas mixture atmosphere consisting of 2.0 vol % of $H_2S$ and 98 vol % of $H_2$, and heated to 900° C. at a temperature rise rate of 10° C./min. The tail gas was tested by using a TCD Detector.

As shown in FIG. 3, the catalyst C1 prepared in Example 1 exhibited adsorption-desorption peaks at the temperatures about 261° C., about 340° C., about 418° C., about 647° C., and about 672° C. As compared with the catalyst DC3 of Comparative Example 3 and the catalyst DC4 of Comparative Example 4, the catalyst C1 of Example 1 also exhibited an obvious $H_2S$ adsorption in high temperature region, while the catalyst DC3 of Comparative Example 3 exhibited $H_2S$ desorption in high temperature region; it indicated that the sulfide intermediate of the catalyst C1 prepared in Example 1 was relatively stable.

Test Example 4

The XPS characterization was carried out on the catalysts prepared in Examples 1, 13 and Comparative Example 3. The XPS characterization was carried out by using AXIS-ULTRADLD ray photoelectron spectroscopy, a monochromatic Al-Kα target source was used, the samples were pressed into sheets prior to testing and evacuated under the condition of $1\times10^{-8}$ Pa. In order to subtract the charge effect, the peak of C1s (with a binding energy of 284.6 eV) of the contaminated carbon was designated as a calibration standard.

Figure 4:
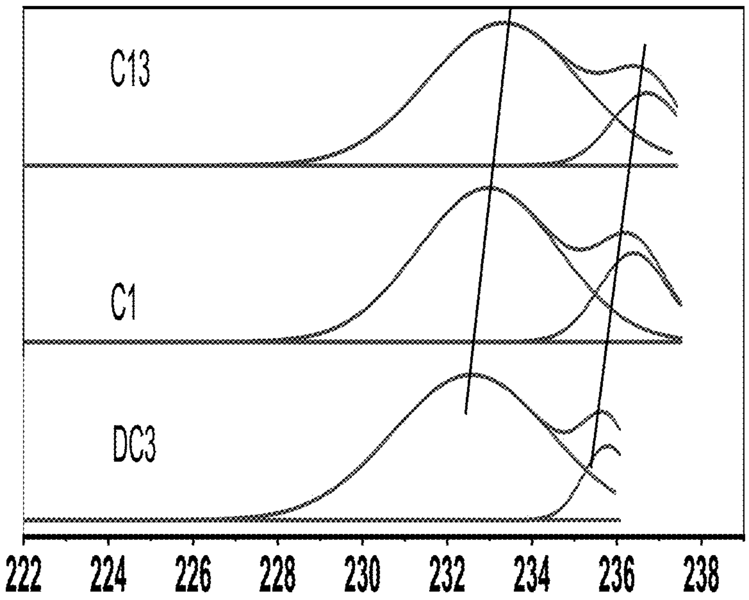
FIG. 4 illustrates XPS patterns of Mo species in perovskite catalysts in Example 1, Example 13 and Comparative Example 3 of the invention.

As shown in FIG. 4, the binding energy of the Mo species in the catalysts C1 and C13 containing the perovskite structure was significantly higher than that of the Mo species loaded on the γ-$Al_2O_3$ catalyst. After the addition of alkaline earth metal in the perovskite structure, the binding energy was further enhanced, it demonstrated that a presence of perovskite caused a further loss of electrons on the Mo surface, and that the interaction force of the environment surrounding the Mo species was further enhanced, which was also consistent with the TPR result.

Test Example 5

The catalysts prepared in Example 1 and Comparative Example 3 were subjected to Raman spectroscopy testing. The Raman spectroscopy testing was performed by using a HORIBA LabRAM HR Evolution type confocal Raman spectrometer, a 35 mV air-cooled He—Ne laser was used, an excitation wavelength was 532 nm. 0.1 g of the powder sample (less than 100 mesh) was utilized for performing the Raman characterization, the spectrogram within a range of 400-3,000 $cm^1$ was recorded.

Figure 5:
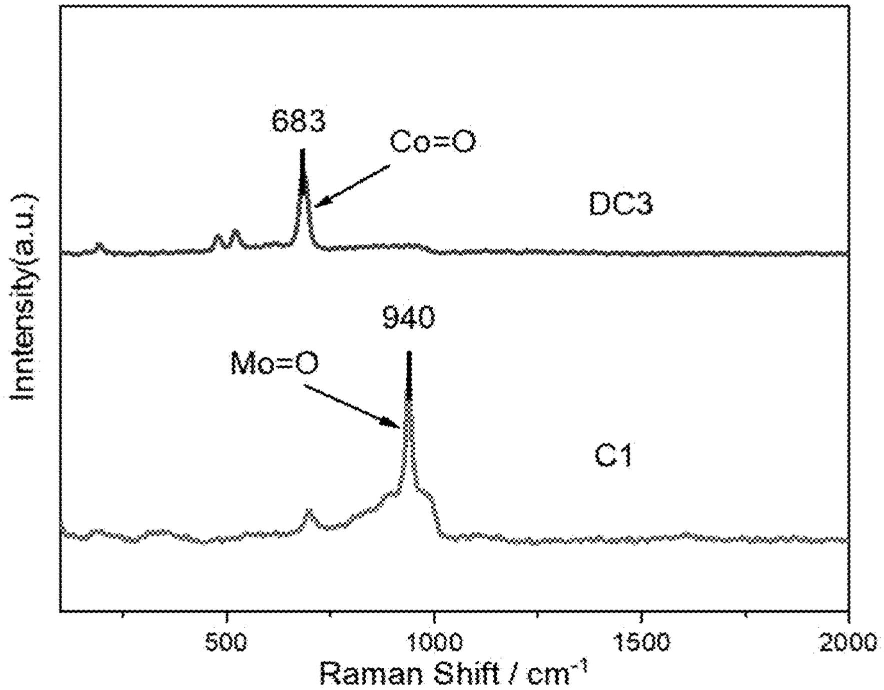
FIG. 5 shows Raman spectrograms of Mo species in the perovskite catalysts in Example 1 and Comparative Example 3 of the invention.

As illustrated in FIG. 5, the catalyst DC3 prepared in Comparative Example 3 did not exhibit a characteristic tensile peak of Mo═O, but only exhibited a characteristic tensile peak of Co═O, under the conditions of equal contents of Mo and Co; it demonstrated that the dispersity of the Mo species in the catalyst was high, and a part of the Co species was present in the form of particles. While the catalyst C1 prepared in Example 1 exhibited a characteristic peak of Mo═O, it indicated that the aggregation degree of the Mo species was high in the catalyst, which is highly dispersed on the surface of γ-$Al_2O_3$; in addition, the content of Co species on a surface of γ-$Al_2O_3$ was obviously reduced, it demonstrates that a part of the Co species was distributed on the perovskite phase surface.

Test Example 6

The carbon monoxide concentration in a tail gas and its variation condition of the catalysts prepared in the Examples and Comparative Examples were tested by simulating the industrial conditions with a pressurized activity evaluation device, thereby comparing the properties, such as shift activity and stability of the catalysts, and evaluating the comprehensive performance of the catalysts.

In the pressurized activity evaluation device, the reaction tube was a stainless steel tube with the dimensions Φ45×5 mm, with a thermocouple tube of the dimensions Φ8×2 mm in the center. A certain amount of water was fed into the reaction tube according to the water-gas ratio of 1.0, and after high-temperature gasification at 200° C., the water vapor was fed into the reaction tube along with the feed gas (the feed gas composition in two tests was as follows: 45 vol % of CO, 2 vol % of $CO_2$, 15 vol %) or 0.05 vol % of $H_2S$, and the balance was H) for carrying out the water gas shift reaction, the reaction temperature was 260° C., and the tail gas obtained after the reaction was chromatographed, the measurement results were shown in Table 1.

In addition, the specific surface area of each catalysts was determined by BET method, the results were shown in Table 1.

TABLE 1

| Catalysts | CO conversion rate ($H_2S$ = 0.15 vol %) | CO conversion rate ($H_2S$ = 0.05 vol %) | Specific surface area($m^2 \cdot g^{-1}$) |
|---|---|---|---|
| Example 1 | 86% | 85% | 180 |
| Example 2 | 86% | 84% | 102 |
| Example 3 | 82% | 80% | 83 |
| Example 4 | 83% | 81% | 137 |
| Example 5 | 84% | 81% | 179 |
| Example 6 | 86% | 82% | 168 |
| Example 7 | 85% | 81% | 170 |
| Example 8 | 85% | 80% | 180 |
| Example 9 | 83% | 79% | 176 |
| Example 10 | 85% | 78% | 173 |
| Example 11 | 86% | 80% | 178 |
| Example 12 | 78% | 77% | 53 |
| Example 13 | 89% | 87% | 170 |
| Example 14 | 90% | 88% | 169 |
| Example 15 | 86% | 84% | 153 |
| Example 16 | 88% | 86% | 136 |
| Comparative Example 1 | 75% | 50% | 130 |
| Comparative Example 2 | 58% | 55% | 94 |
| Comparative Example 3 | 79% | 60% | 121 |
| Comparative Example 4 | 59% | 58% | 30 |
| Comparative Example 5 | 55% | 55% | 10 |
| Comparative Example 6 | 70% | 69% | 15 |
| Comparative Example 7 | 70% | 50% | 150 |
| Comparative Example 8 | 50% | 30% | 35 |
| Comparative Example 9 | 72% | 52% | 132 |

As illustrated from Table 1, the catalysts prepared in the Examples of the invention have a higher CO conversion rate in sulfur-tolerant shift reaction than the catalysts prepared in the Comparative Examples, and also exhibit desirable CO conversion rate especially in the case of a low $H_2S$ content in the feed gas; as can be seen, the catalysts of the invention exhibit a desired catalytic activity in sulfur-tolerant shift reaction. The catalysts of the invention can maintain a high CO conversion rate and stability even when the $H_2S$ content in the reaction gas fluctuates. The above content describes in detail the preferred embodiments of the invention, but the invention is not limited thereto. A variety of simple modifications can be made in regard to the technical solutions of the invention within the scope of the technical concept of the invention, including a combination of individual technical features in any other suitable manner, such simple modifications and combinations thereof shall also be regarded as the content disclosed by the invention, each of them falls into the protection scope of the invention.

The invention claimed is:

1. A catalyst comprising a carrier, and a molybdenum oxide, a cobalt oxide and a cobalt-molybdenum-based perovskite composite oxide carried thereon, the cobalt-molybdenum-based perovskite composite oxide comprises a molybdenum element, a cobalt element, an A element, and oxygen;

wherein the A element is one or more selected from rare-earth metal elements, alkali metal elements and alkaline earth metal elements.

2. The catalyst of claim 1, wherein the A element includes an $A_1$ element being one or more selected from the rare-earth metal elements and an $A_2$ element being one or more selected from alkali metal elements and alkaline earth metal elements.

3. The catalyst of claim 2, wherein a molar ratio of the A1 element to the A2 element is 1-99: 99-1.

4. The catalyst of claim 3, wherein a molar ratio of the A1 element to the A2 element is 1-9: 9-1.

5. The catalyst of claim 2, wherein the catalyst exhibits characteristic peaks at 24.9±0.2° (2θ).

6. The catalyst of claim 5, wherein the catalyst exhibits characteristic peaks at 24.9±0.2°, 27.9±0.2°, and 36.2±0.2° (2θ) in the X-Ray Diffraction (XRD) pattern.

7. The catalyst of claim 2, wherein the $A_1$ element is one or more selected from La, Ce, Nd, and Gd, the $A_2$ element is one or more selected from Na, K, Mg, Ca, and Sr.

8. The catalyst of claim 1, wherein the catalyst exhibits a characteristic peak at 27.9±0.2° (2θ).

9. The catalyst of claim 8, wherein the catalyst exhibits characteristic peaks at 24.9±0.2°, 27.9±0.2°, and 36.2±0.2° (2θ) in the X-Ray Diffraction (XRD) pattern.

10. The catalyst of claim 1, wherein the catalyst has a main reduction peak temperature of 600° C. or more.

11. The catalyst of claim 10, wherein the catalyst has a main reduction peak temperature within a range of 600-850° C. in the $H_2$-TPR pattern.

12. The catalyst of claim 1, wherein the A element is one or more selected from La, Ce, Nd, Gd, Na, K, Mg, Ca, and Sr.

13. The catalyst of claim 1, wherein the catalyst has two or more adsorption-desorption peaks at a temperature of 200° C. or more in a programmed temperature rise sulfidation test.

14. The catalyst of claim 1, wherein the content of A element in the catalyst is 0.4 mol or more and less than 1 mol, relative to a total of 1 mol of molybdenum and cobalt.

15. The catalyst of claim 1, wherein the content of molybdenum in the catalyst is more than 0.4 mol and less than 1 mol, relative to a total of 1 mol of molybdenum and cobalt.

16. The catalyst of claim 1, wherein the carrier is selected from alumina, silica, titanium dioxide, zirconium dioxide, magnesium oxide, nickel oxide, a carbon-based carrier, and mixtures thereof.

17. The catalyst of claim 1, wherein the catalyst comprises a carrier in an amount of 30-90% by mass.

18. The catalyst of claim 1, wherein the catalyst has a specific surface area of 40 $m^2 \cdot g^{-1}$ or more.

19. A method for sulfur-tolerant shift catalytic reaction, comprising: contacting CO in a feed gas with water vapor in the presence of the catalyst of claim 1;

wherein the feed gas comprises $H_2S$ in an amount of 100 ppm or more.

20. The method of claim 19, wherein the content of $H_2S$ is within a range of 100-1,500 ppm.

* * * * *